United States Patent [19]

McGinniss et al.

[11] Patent Number: 5,052,820
[45] Date of Patent: Oct. 1, 1991

[54] THERMAL REFRACTIVE MATERIALS FOR OPTICAL SENSOR APPLICATION

[75] Inventors: Vincent D. McGinniss, Powell; Robert S. Whitmore, Jr.; Stuart A. Kingsley, both of Columbus, all of Ohio

[73] Assignee: Electric Power Research Institute, Inc., Palo Alto, Calif.

[21] Appl. No.: 393,977

[22] Filed: Aug. 15, 1989

Related U.S. Application Data

[63] Continuation of Ser. No. 59,545, Jun. 8, 1987, abandoned.

[51] Int. Cl.$^5$ .............. G01J 5/08; G02B 6/02
[52] U.S. Cl. .................... 374/131; 250/227; 252/962; 356/43; 374/161
[58] Field of Search ........... 374/131, 17, 18, 152, 374/161, 160; 356/43; 250/227; 252/962; 350/96.29

[56] References Cited

U.S. PATENT DOCUMENTS

| | | | |
|---|---|---|---|
| Re. 31,715 | 10/1984 | Coates et al. ............ | 252/962 X |
| 3,878,722 | 4/1975 | Crites ...................... | 374/162 |
| 4,151,747 | 5/1979 | Gottlieb et al. . | |
| 4,154,106 | 5/1979 | Inoue et al. ............ | 374/160 X |
| 4,160,926 | 7/1979 | Cope et al. ............ | 310/214 X |
| 4,295,739 | 10/1981 | Meltz et al. . | |
| 4,298,794 | 11/1981 | Snitzer et al. ............ | 374/161 |
| 4,302,970 | 12/1981 | Snitzer et al. ............ | 250/227 X |
| 4,417,782 | 11/1983 | Clarke et al. . | |
| 4,443,698 | 4/1984 | Schiffner . | |
| 4,469,452 | 9/1984 | Sharpless et al. ............ | 374/131 X |
| 4,505,542 | 3/1985 | Clarke . | |
| 4,749,856 | 6/1988 | Walker et al. ............ | 250/227 |
| 4,756,599 | 7/1988 | Maeda et al. ............ | 350/96.29 |

*Primary Examiner*—William A. Cuchlinski, Jr.
*Assistant Examiner*—William Dowling
*Attorney, Agent, or Firm*—Flehr, Hohbach, Test, Albritton & Herbert

[57] ABSTRACT

Improved thermooptical sensing devices are provided wherein at various predetermined sectons of an optical fiber is juxtaposed a material characterized by a temperature dependent index of refraction. This material forms a temperature sensitive area which controls the transmission of light through the optical fiber thereby allowing detection of temperature changes along the fiber. The materials may be crystalline thermoplastic polymers, modified organic polymers containing inorganic modifiers, polymer systems containing discrete phases of organic polymers and inorganic additives or thermochromic inorganic compounds.

12 Claims, 7 Drawing Sheets

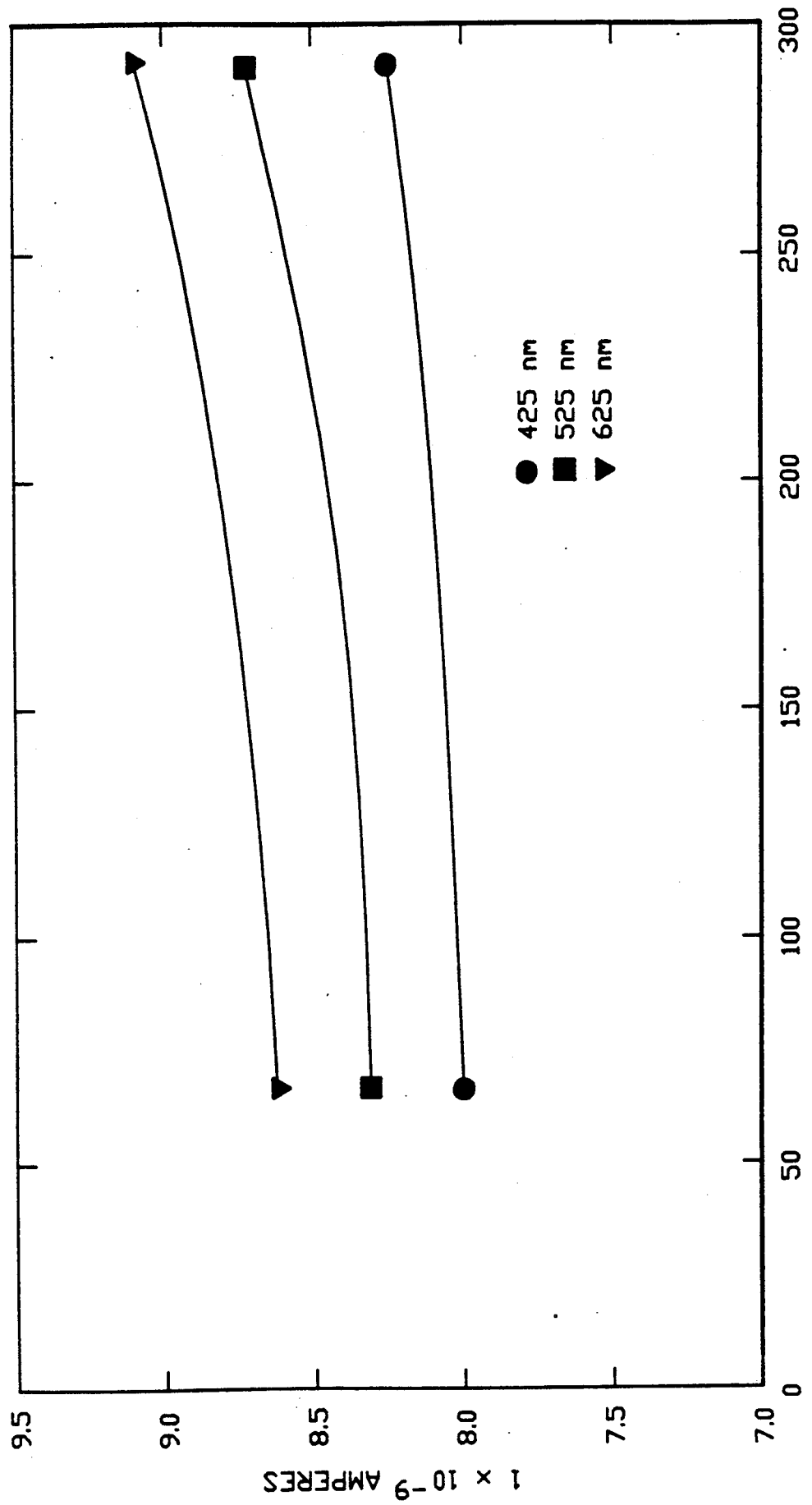

THERMAL REFRACTIVE MATERIALS FOR OPTICAL SENSOR APPLICATION

This application is a continuation of Ser. No. 59,545, filed June 8, 1987 and now abandoned.

The present invention relates generally to fiber optic temperature monitoring devices and materials for use therein. In particular the present invention is directed to monitoring devices for sensing temperature changes in electrical equipment, for example, generators.

BACKGROUND OF THE INVENTION

Generally, fiber optic sensors are known which monitor temperature at particular points within an operating transformer or generator by direct measurement, that is, by sensing a temperature directly at or in close proximity to a transformer or inner workings of a generator. See U.S. Pat. No. 4,151,747, commonly assigned herewith.

It is an object of the present invention to provide improved temperature monitoring arrangements and materials for use therein for sensing temperature changes utilizing fiber optic sensors.

This and other objects will be apparent to those of ordinary skill in the art from the following description and appended claims.

SUMMARY OF THE INVENTION

The present invention provides thermal optical sensing devices, comprising an optical fiber, means for coupling light into the fiber and means for measuring changes in the light transmission through the fiber to determine change in thermal environment at one or more predetermined sections of the fiber, wherein at each such predetermined section of the fiber is juxtaposed a material characterized by a temperature dependent index of refraction over a predetermined temperature range, such that at each such section transmission of light through the fiber is substantially changed by at least a predetermined amount, wherein the improvement comprises such material selected from the group consisting of:

(a) a thermoplastic polymer which is crystalline and essentially opaque to light at a first temperature, and which is substantially transparent to light when heated to form an amorphous phase at a temperature within a predetermined temperature range;

(b) a modified organic polymer containing inorganic modifiers, wherein the modified organic polymer is essentially transparent to light at a first temperature and is essentially opaque to light when heated to a temperature within a predetermined temperature range;

(c) a polymer system comprising discrete phases of organic polymers and inorganic additives wherein the system is essentially transparent to light at a first temperature and is essentially opaque to light when heated to a temperature within a predetermined temperature range; and (d) a thermochromic inorganic material characterized by a change of transmission of light therethrough of a predetermined wavelength when said inorganic material is heated from a first temperature to a second temperature within a predetermined temperature range.

BRIEF DESCRIPTION OF THE DRAWINGS

FIG. 6 is a graph of the transmission response of a copper nitrate doped hollow silicon fiber as a function of temperature.

FIGS. 7A, 7B and 7C, show respectively, the transmission characteristics during the first temperature cycle, second temperature cycle and third temperature cycle whereby in each cycle the sheet was heated from 40° to 200° C. and allowed to cool to 40° C.

DESCRIPTION OF THE PREFERRED EMBODIMENTS

Figure 1A:
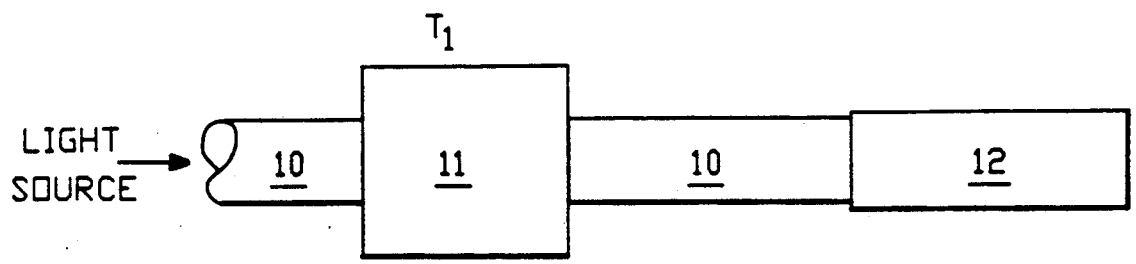
FIGS. 1A and 1B are illustrations of the basic geometry for use of the materials according to the present invention depicting a configuration at temperature $T_1$ and the same configuration at temperature $T_2$.
Figure 1B:
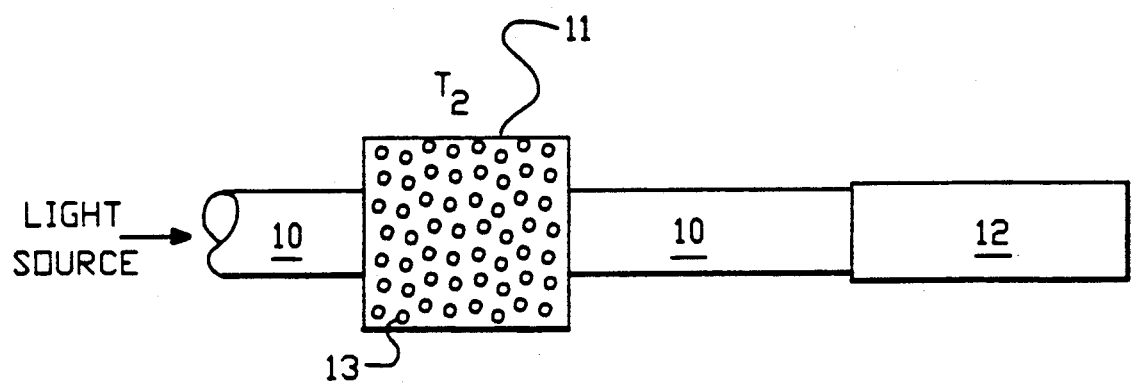

The present invention provides improvements in thermal optical sensing devices by providing materials which change from essentially opaque to essentially transparent to light of a predetermined wavelength within a predetermined temperature range. Referring to FIG. 1 there is shown the basic geometry for the use of the materials according to the present invention as thermal optical sensors which may be utilized as temperature monitors. The top illustration (1A) in FIG. 1 shows the general geometry at temperature $T_1$ and the lower figure shows the same geometry at temperature $T_2$. According to the top illustration in FIG. 1, a light source is provided which will allow light of a particular wavelength to traverse an optical fiber 10 toward an appropriate light detector 12. At various sections along the fiber 10 or along its entire length, where it is desirable to have a temperature sensor, material 11 according to the present invention is provided. In the illustration of FIG. 1, material 11 is at temperature $T_1$ (for example, room temperature), and is transparent to the light traversing the optical fiber 10. Referring to the lower FIG. (1B), when the environment of material 11 changes to temperature $T_2$, material 11 undergoes a phase change wherein its index of refraction to the particular wavelength of light changes. While not being limited by any particular theory, for purposes of illustration only, the phase changes are indicated in the lower illustration of FIG. 1 by discrete polymeric phases 13 which cause the scattering of the light and consequently the amount of light transmitted to the detector 12 along fiber 10 is substantially reduced or in some cases eliminated.

Figure 2A:
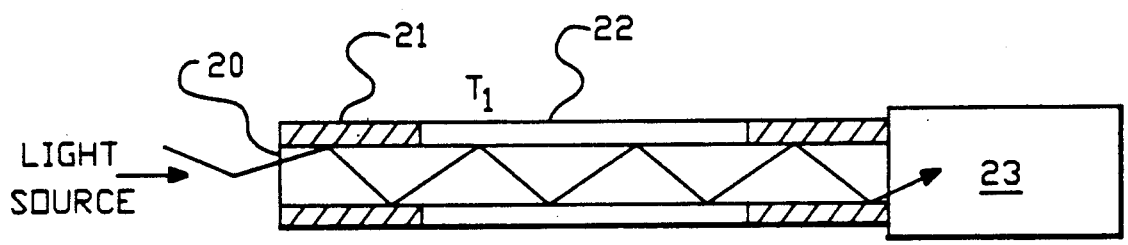
FIGS. 2A and 2B show a second configuration using the materials according to the present invention wherein the upper illustration shows an optical fiber at temperature $T_1$ and the lower illustration shows the same configuration at a temperature $T_2$.
Figure 2B:
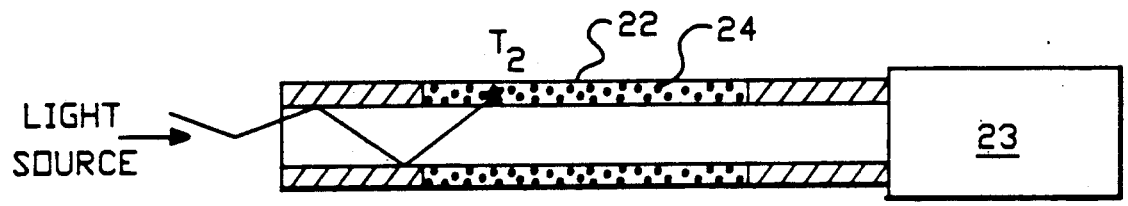

Referring to FIG. 2 there is shown an alternate embodiment of a configuration using the materials according to the present invention. In the upper illustration (2A) of FIG. 2 the optical fiber comprises a central core 20 in a cladding made of materials 21 and 22. The core 20 and cladding material 21 will be essentially temperature independent regarding their indices of refraction within the temperature range being considered. Along the length of the fiber where it is desired to be temperature sensitive, in place of cladding 21 there is utilized material 22 according to the present invention. In normal (such as at room temperature) operation the light travels along the optical fiber core 20 reflecting off the walls and eventually into detector 23. In the lower illustration (2B) of FIG. 2, temperature and environment of material 22 is now changed to temperature $T_2$ whereupon, as illustrated, polymeric phases 24 are formed which convert the material 22 to an absorptive mode rather than a reflective mode. Therefore, the light is absorbed into material 22 and the amount of light ultimately transmitted to detector 23 is substantially reduced and some cases even eliminated.

It will be realized that the materials according to the present invention also encompass the embodiment wherein the thermal optical switch is used in a reverse sense, i.e. the material at a normal utilization temperature is opaque to the transmitted light and thus the detector reads 0 transmitted light. When the temperature in the environment of the material changes, then a phase change (for example melting into a clear liquid) occurs thereby allowing for greater light transmission resulting in a reading at the detector.

A first preferred class of materials according to the present invention comprises polymers which are crystalline at a first temperature (such as, at ambient temperatures) and essentially opaque to light, but when heated to a predetermined temperature range will form an amorphous phase essentially transparent to light. Preferably, the transition to the transparent form will occur around 120° to 150° C. which corresponds to approximately 50° C. above the normal working temperature of a generator. The preferred point of transition is about 130° C. Thermoplastic polymers meeting this requirement include polyalkylenes, polyalkylene oxides, paraffin, and fatty acids. Particularly preferred are polyethylene and polyethylene oxide.

Commercially available polymer-clad silica (PCS) optical fibers have silica cores and thermoplastic polymeric cladding, as set forth in Table 1 below. However in many of these PCS fibers, the polymer cladding has a higher index of refraction than the core silica, thus making them unsuitable for the present invention. By placing the polymeric materials, however, inside a hollow silica fiber, the proper relationship may be obtained.

TABLE 1
SOME SOURCES OF PCS FIBER

| Manufacturer | Type | Jacket | Operating Temperature Range (C.) |
|---|---|---|---|
| Ensign-Bickford Optics Co. | HC206-H | Hytrel | — |
| Belling & Lee Ltd. | L2800/VAR | PVC | −10−+80 |
| Fort SA | PX 200 | Hytrel | −40−+90 |
| Quartz Products Corp. | QSF-200 | Tefzel | — |
| Brand-Rex Co. | Superguide | — | −46−+70 |
| Fiberguide Industries Inc. | — | PFA | −40−+200 |
| SpecTran Corp. | 640 | — | −40−+90 |

The second class of material according to the invention comprises modified organic polymers containing inorganic modifiers which are essentially transparent to light at the first temperature but are essentially opaque to light when heated to a temperature within a predetermined temperature range, which is preferably 120° to 150°. Materials include base-neutralized maleic anhydride-modified polybutadiene with magnesium chloride.

The third class of materials according to the present invention comprises polymer systems comprising discrete phases of organic polymers and inorganic additives where the system is essentially transparent to light at a first temperature and essentially opaque to light when heated to a temperature within a predetermined temperature range preferably about 120° to 150° C.). This class of materials is intended to include liquid crystals. One preferred polymer system is formed from ethylene propylene diene monomer rubber, silica, trymethylol propane, triacrylate and di-t-butyl peroxide. A particularly preferred composition consists essentially of ethylene propylene monomer rubber (EPDM Nordel 1320 rubber from Dupont), five to twenty parts by weight of silica, 2% by weight A-174 Coupling Agent (Union Carbide), ten parts by weight of trimethylol propane triacrylate (Arco) cured with three parts di-t-butyl peroxide at 160° for 30 minutes as described in U.S. Pat. No. 4,491,653. This particular composition has essentially 100% light transmission at room temperature, which is reduced to 20 to 50% transmittance when heated to 130° C.

A second preferred polymer system comprising discrete phases comprises a urethane diacrylate, trimethylol, propane triacrylate, hexanediol diacrylate, and diethoxyacetophenone. A particular preferred composition is formed from an adduct of 2 to n+1 moles of isophorone diisocyanate to 1 to n moles of polypropylene glycol (molecular weight 1000 to 2000), reacted with 2 moles of hydroxyethylacrylate to form a reactive, flexible urethane diacrylate polymer. The integer n may be form 1 to approximately 10,000. The reactive, flexible urethane diacrylate polymer (25% by weight) is then blended with trimethylol propane triacrylate (5% by weight), hexane dioldiacrylate (68% by weight) and then a photoinitiator (2% diethoxyacetophenone) is added. The entire mixture is cured with ultraviolet light and formed into an appropriate disk, sheet or other form. This particular composition at room temperature has a light transmittance of 100%, and at 100° C. it has a light transmittance in the range of 50 to 80%.

A fourth class of materials comprises thermochromics, particularly in the configuration shown in FIG. 1. Thermochromic materials are those materials (especially inorganic materials) which cause a temperature-dependent change in transmittance of light at a particular wavelength. Thus, for example if mercuric iodide is used as material 11 in FIG. 1 and the light source is a helium neon laser, then heating of the mercuric iodide to 220° C. will selectively change the spectral transmission characteristics such that the attenuation in the red region will increase by 10% to 20% with respect to the yellow region. Mercuric iodide is reversible in this respect and thus if it is cooled to below 120° it reverts to its original spectral attenuation profile.

On the other hand, if copper nitrate (as the copper nitrate hexahydrate) is used as the material 11 in FIG. 1 in a tetrahydrofuran solution, upon heating the solution a spectral change in the transmission characteristics will occur. It changes from blue to green and thus causes a change in the transmittance of red light from a helium neon laser to the detector. This transition, however, is not reversible by cooling the solution.

Figure 3:
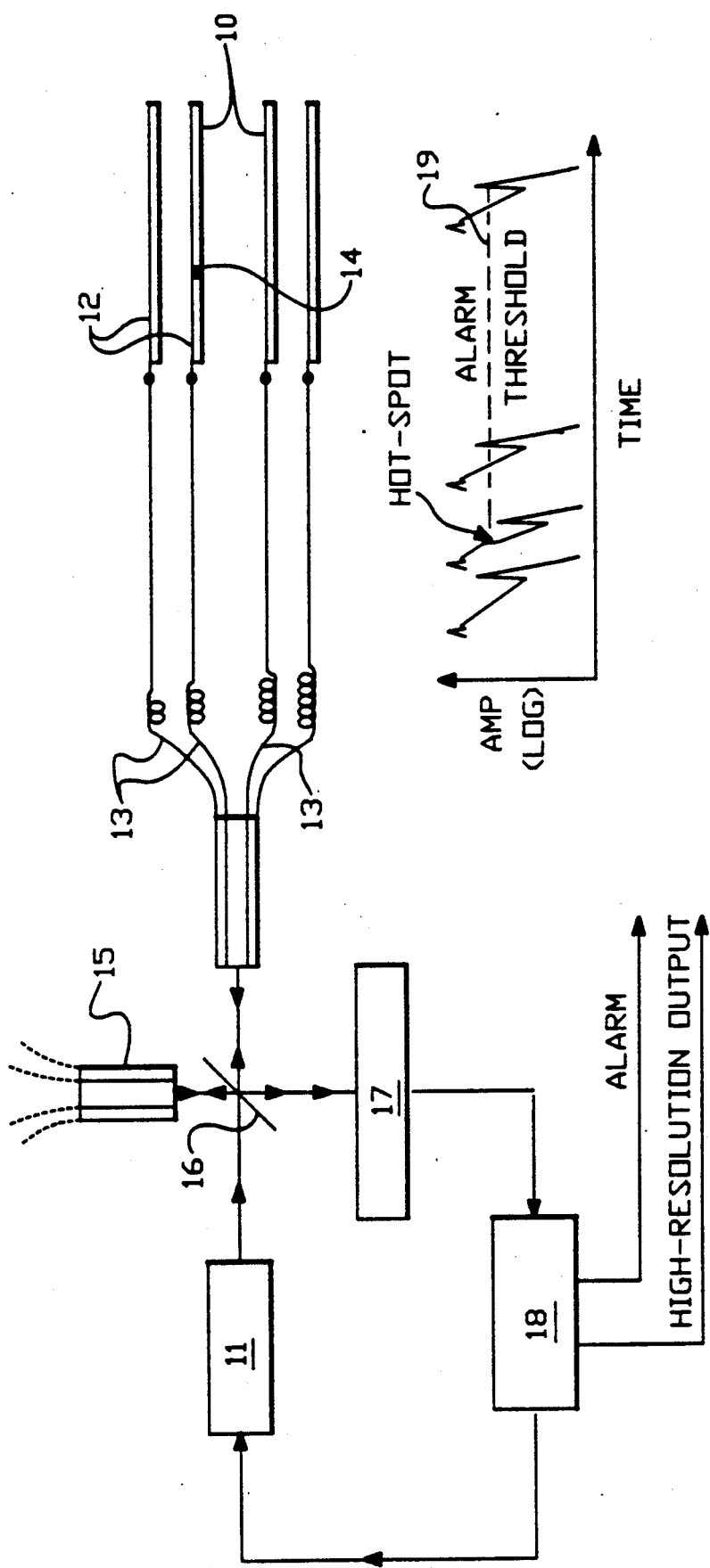
FIG. 3 is a schematic diagram of a distributed fiber-optic hot-spot sensor system in accordance with the present invention, showing a system for sensing hot spots on stator bars.

Referring to FIG. 3 there is shown a diagram of a developed distributed fiber-optic hot-spot sensor system in accordance with the present invention. As shown a plurality of stator bars 10 are arranged in parallel and a common laser 11 simultaneously launches light into all of the sensing fibers 12 colinearly aligned respectively with each bar 10. Each sensing fiber 12 is attached to a delay line fiber 13 of differing lengths so that it is possible to sort out which sensing fiber 12, and hence which stator bar 10, has a hot spot, shown as 14. A second generator-set (not shown) can be monitored using another bundle of fibers 15 attached to the second port of a beam splitter/combiner 16, or the second bundle 15 may be used for redundancy in one machine. The lengths of the fibers used in the second bundle must differ from that of the first bundle, or a gating shutter must be employed at the beam splitter/combiner port. A photodetector 17 detects changes in the optical transmission in the fibers, indicating the hot spot 14, and the signal is processed in a signal processor 18. The signal processor 18 may be programmed initially in an alarm mode where threshold detectors would monitor the amplitudes of the fresnel reflections from the sensing fibers. Referring to the graphic insert in FIG. 3, if any far-end fresnel reflection should fall below a given threshold level 19, then an alarm would sound and the signal processor would switch to a high resolution diagnostic mode where detailed could be printed and graphed of the temperature profiles along each of the stator bars.

Other thermochromics include diynes, spiropyrans, thermochromic ethylene compounds, thermochromic sulfur-containing compounds and thermochromic nitrogen-containing compounds, such as, arlimines, and Schiff bases. The thermochromic properties of these organic compounds are disclosed, for example, in Chem. Rev. 43, 509 (1948); 63, 65 (1963); and Chem. Abstr. 101:17029y and 54357u (1984).

The following examples are given by way of illustration and are not intended to limit the scope of the invention in any way.

EXAMPLE 1

Sensor Comprising An Organic Polymer Containing Inorganic Modifiers

A six inch length of hollow silica capillary was filled with a 10% solution of a calcium neutralized malenized polybutadiene polymer in water. At room temperature the light transmission through or around the fiber was high, but upon heating to 70° to 100° C., the polymer solidified into a white opaque mass resulting in over 50% loss in light transmission of the system. Upon cooling the fiber, the polymer returned to solution and allowed for normal light transmission.

EXAMPLE 2

Sensor Comprising An Inorganic Thermochromic Compound

Mercuric iodide ($HgI_2$) undergoes a thermally reversible color change when heated from room temperature (red) to 70° C. (yellow). See Bube, R. H., *Physical Review*, 106 (4), 703-797 (1957). A one meter length of optical fiber was dipped into a 10% solution of mercuric iodide in tetrahydrofuran, then withdrawn, air dried to produce a thin coating on the fiber surface. A helium-neon laser light source is then used to visually detect the thermally reversible mercuric iodide light interaction effect. At room temperature, the coated fiber was totally transparent to red light at the surface of the fiber, but when the temperature was raised to 70° C., the red light was no longer visible in the region where the heat was applied onto the fiber surface. Upon cooling to room temperature, the red light became readily visible in the region previously stressed by thermal energy.

EXAMPLE 3

Sensor Comprising An Inorganic Thermochromic Compound

Figure 4:
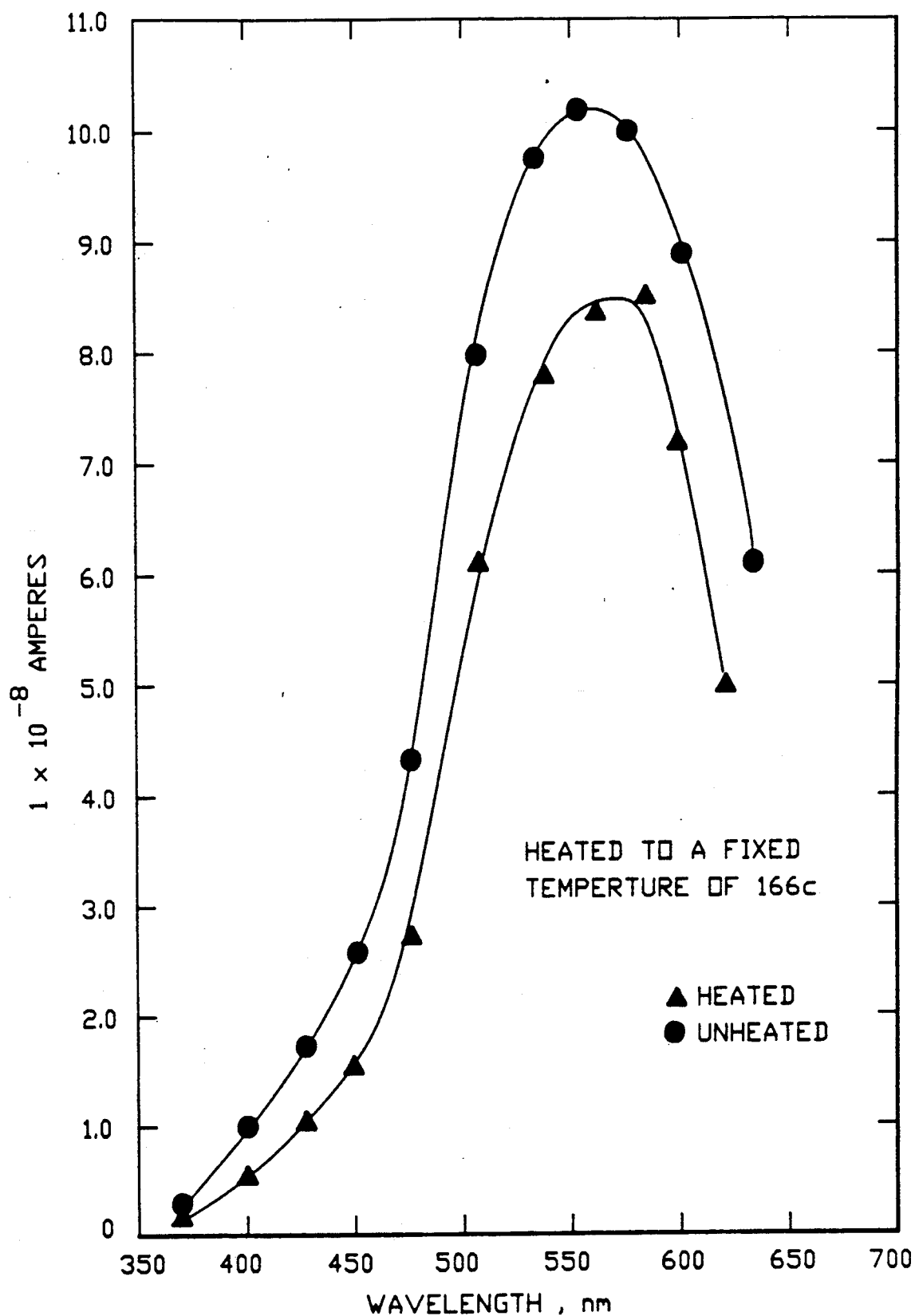
FIG. 4 is a graph showing the transmission characteristics for a hollow silica fiber (125 micrometers in diameter) coated with copper nitrate using a cadmium sulfide photodetector.
Figure 5:
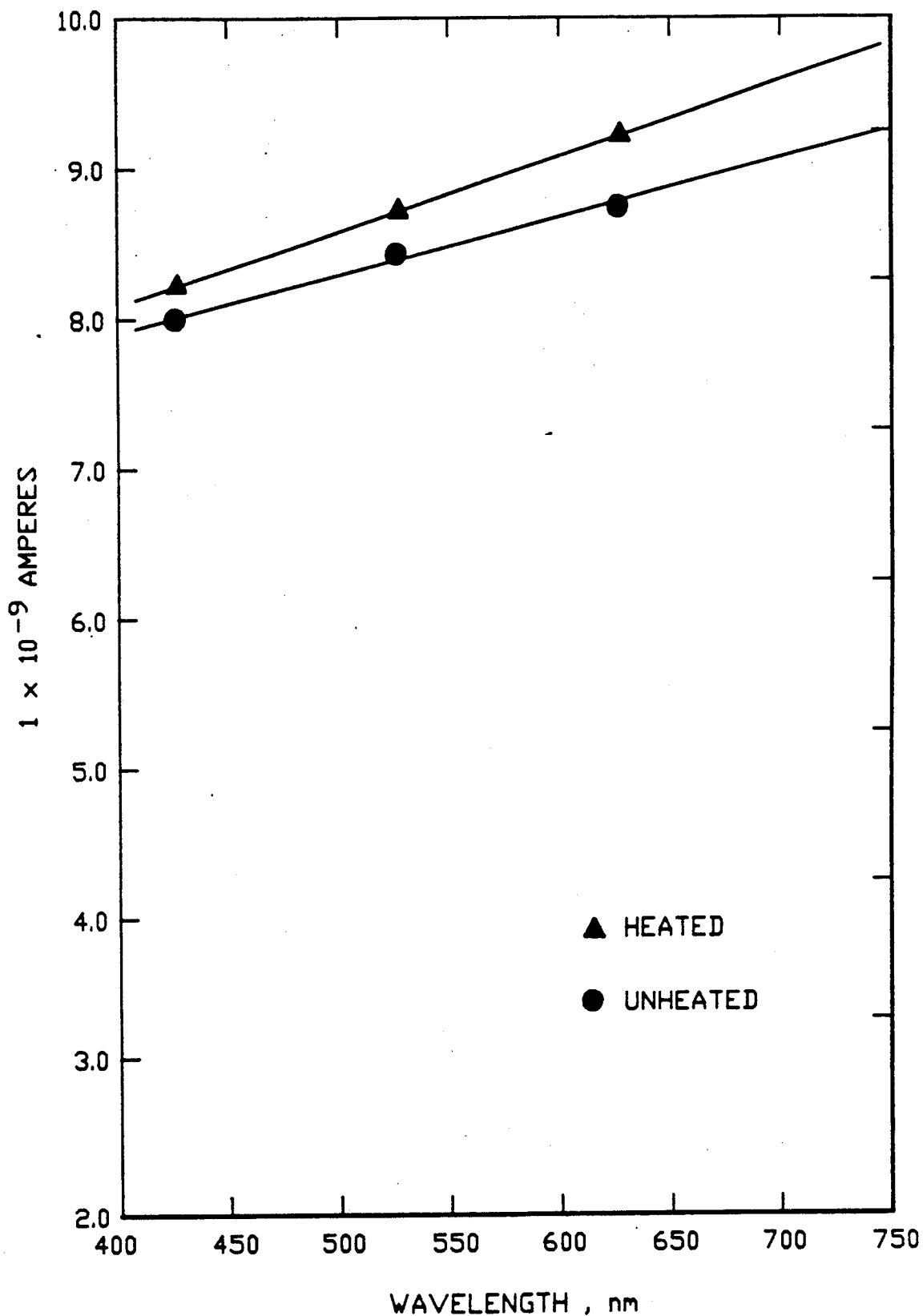
FIG. 5 is a graph showing the transmission characteristics of a hollow silica fiber (125 micrometers in diameter) coated with copper nitrate using a PL model FP-1 photodetector.

A one meter length of optical fiber was dipped into a 10% or greater copper nitrate ($Cu(No3)2H2O$) in tetrahydrofuran solution and dried to produce a thin coating on the fiber surface. The transmission characteristics of this coated fiber was studied using a Kodak Ektagraphic AF-2 projector with a 300 watt, 120 volt multimirror lamp projecting through a Bausch & Lomb monochromator grafting 1350 grooves/mm. The light source is projected through the monochromator into one end of the fiber. At the other end of the fiber a cadmium sulfide photocell received the transmitted light and processed by a Keithley electrometer 612BR. The projector lamp output wavelength show a maximum at 550 nm using a cadmium sulfide photodetector. Changes in light intensity as measured by the photodetector were monitored through the use of an electrometer and recorded as changes in current in units of $3 \times 10^{-8}$ amperes. Both unheated and heated (to 166° C.) uncoated control fibers showed very little change in light intensity output throughout the 375 to 625 nm wavelength region. The copper nitrate coated sample however, showed a very definite change in light intensity output, especially in the 500 to 625 nm wavelength region when heated to the same fixed temperatures. The transmission characteristics of the copper nitrate coated fiber are shown in FIG. 4. Similar results were obtained for a copper nitrate coated optical fiber using an NPL model FP1 photodetector. The transmission characteristics of the copper nitrate coated fiber as shown in FIG. 5. Another measure of temperature/wavelength sensitivity of the copper nitrate system is shown in FIG. 6. The uncoated fiber (data not shown) is essentially linear in wavelength light intensity response over the range of 10° to 140° C. However the copper nitrate coated samples (FIG. 6) appeared to be linear in response up to about 110° C., then reach a maximum wavelength of light intensity output approximately at 145° C. Although this change in light intensity as a function of temperature is apparently not reversible for the copper nitrate system, it is possible to use the same coated fiber over again several times and still observe similar phenomena.

EXAMPLE 4

Sensor Comprising A Polymer System Forming Discrete Phases

Figure 7A:
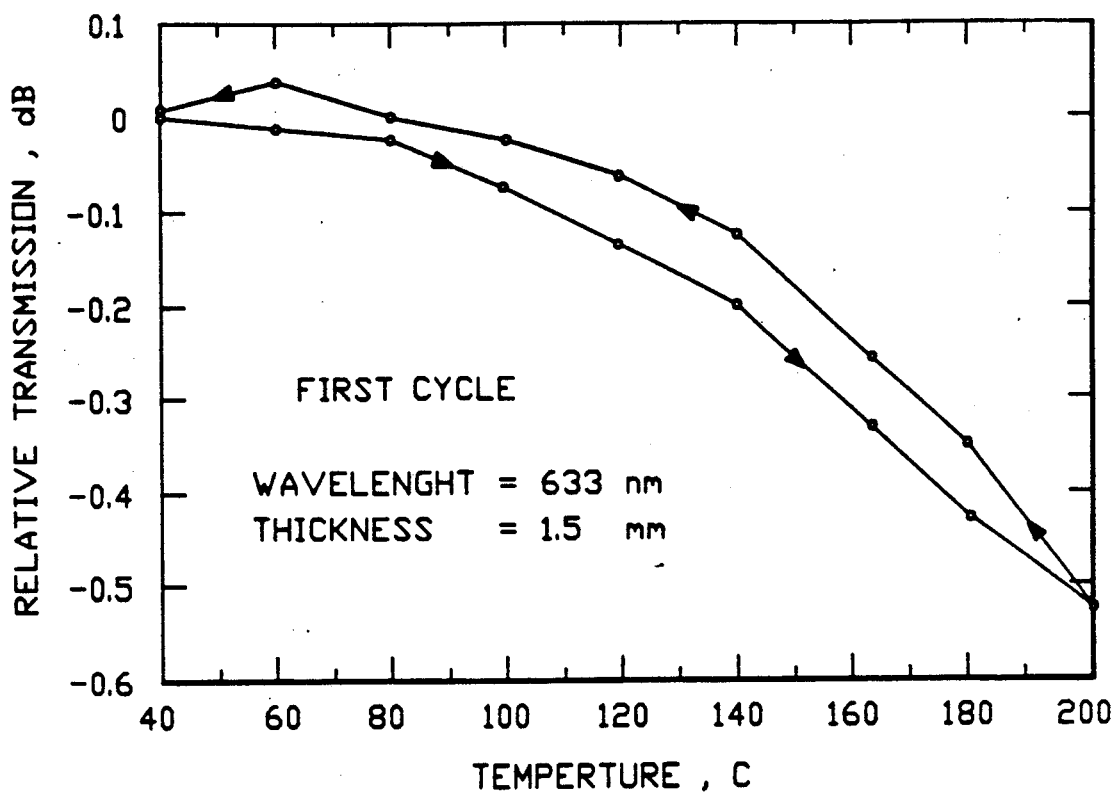
FIGS. 7A, 7B and 7C are graphs showing the transmission characteristics of a bulk ethylene-propylene-diene monomer sheet (1.5 mm thickness) as probed by a helium-neon laser at 633 nm.
Figure 7B:
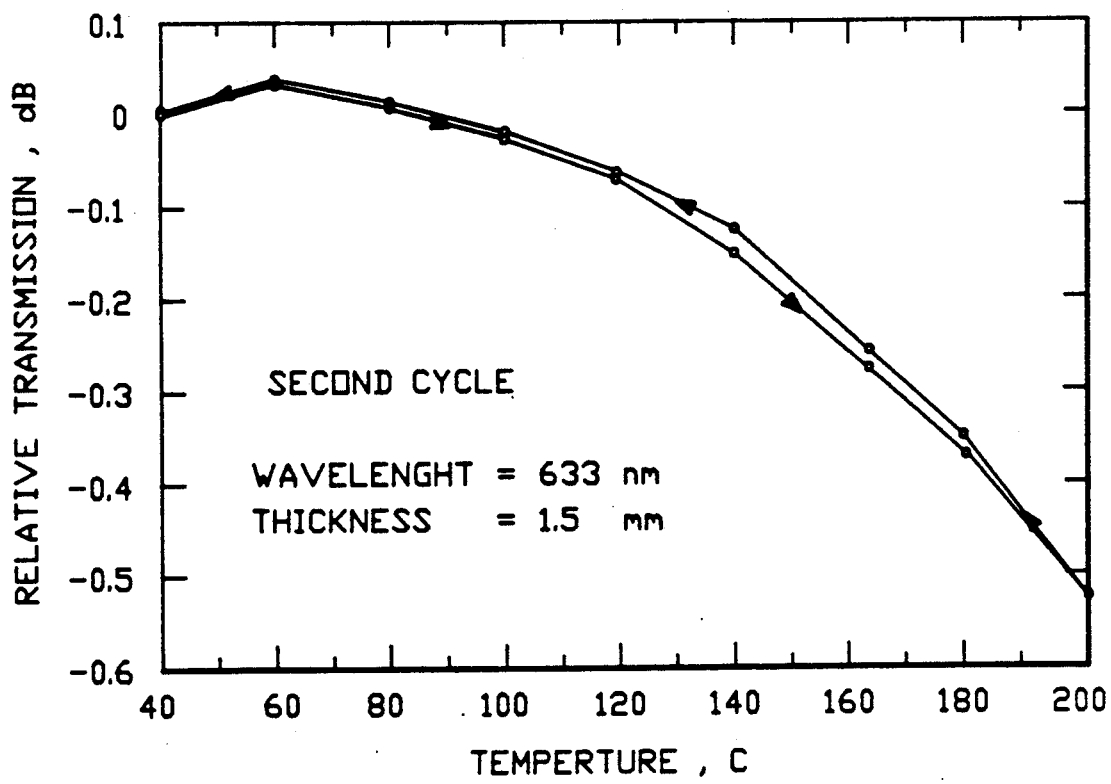
Figure 7C:
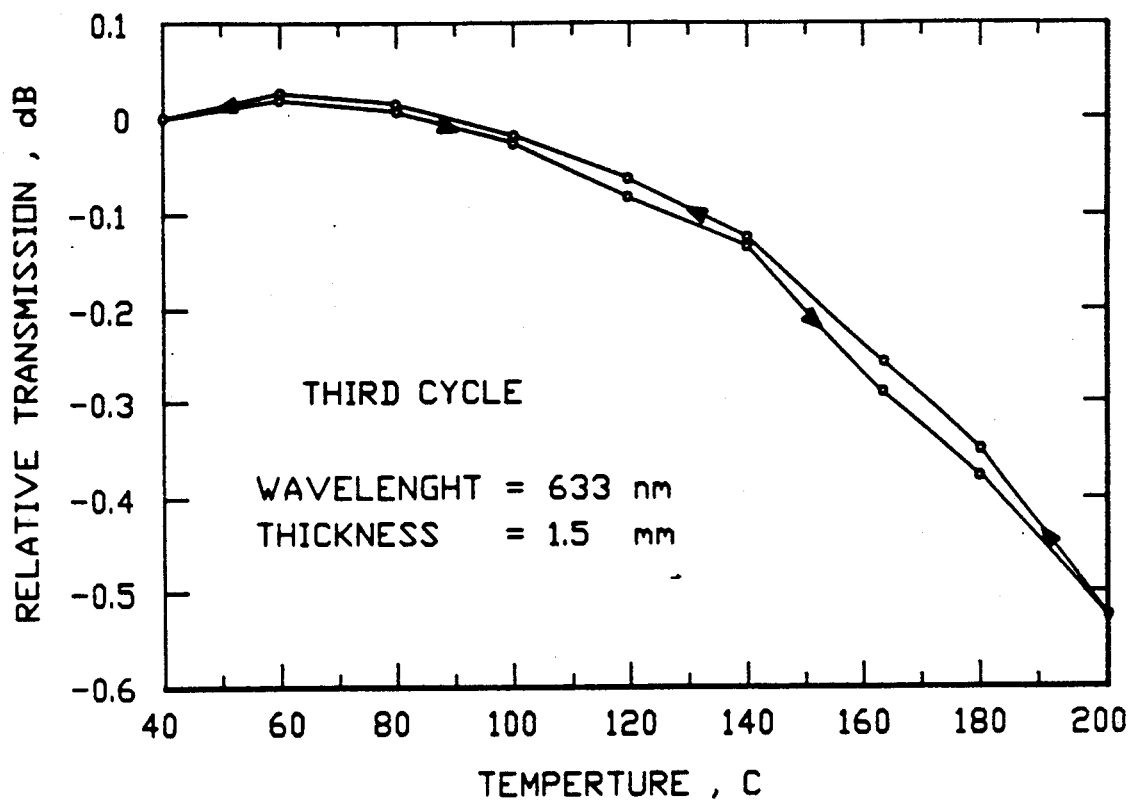

A thin sheet of ethylene-propylene-diene monomer (EPDM, 1.5 mm thickness) was probed with a helium-neon laser at 633 nm. EPDM consists of Nordel 1320 rubber (DuPont), 5-20 parts silica, 2% A-174 (a coupling agent from Union Carbide), 10 parts of a multifunctional acrylate (trimethylolpropane triacrylate from Arco), and 3 parts of di-t-butyl peroxide, cured at 160° C. for 30 minutes under pressure. FIGS. 7A, 7B and 7C show the relative transmission versus temperature for the first three temperature cycles of testing the EPDM. The results indicate that over this temperature range (40° to 200° C.), the material is reversible in the measured optical properties.

EXAMPLE 5

Sensor Comprising A Polymer System Forming Discrete Phases

Figure 8:
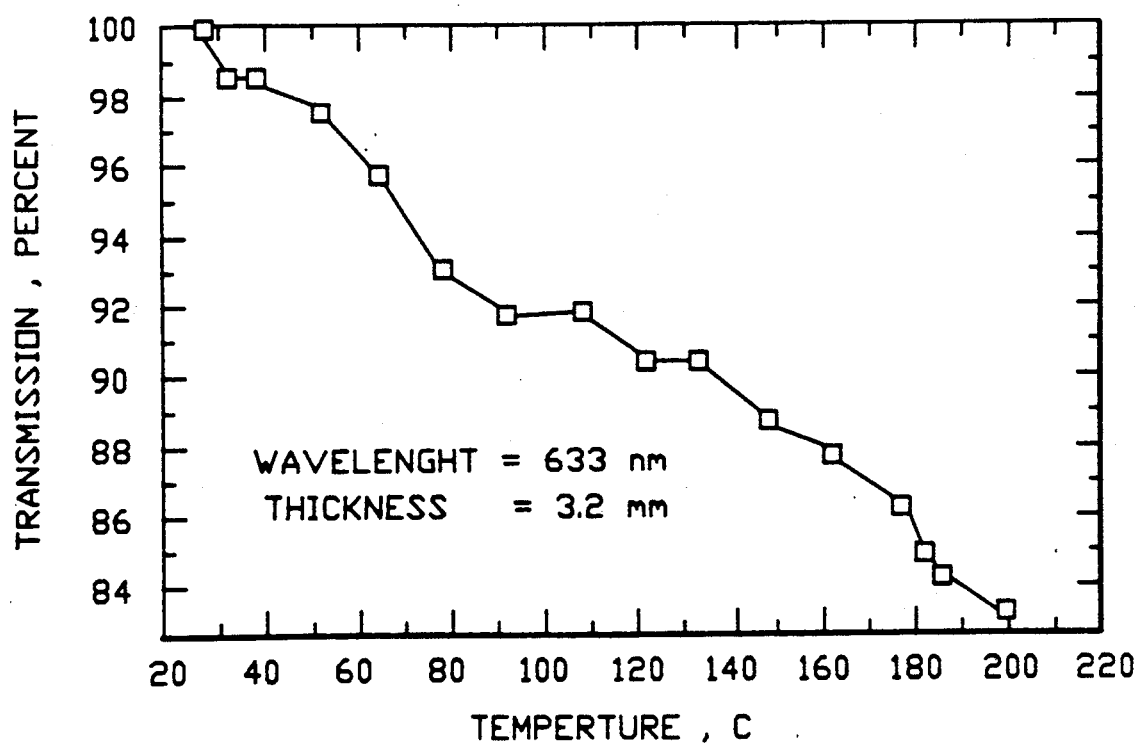
FIG. 8 is a graph of the transmission characteristics of a thin disk of an acrylic resin, thickness 3.2 mm, probed at a wavelength of 633 nm.

An ultraviolet curable acrylic was made by forming the adduct of 2, 3 or 4 or n+1 moles of isophorone diisocyanate to 1, 2, 3 or n moles of polypropylene glycol (1000 to 2000 molecular weight) followed by reaction with 2 moles of hydroxethylacrylate. This forms a reactive flexible urethane diacrylate polymer which was then blended (25%) with trimethylolpropane triacrylate (TMPTA), 5%; hexandedioldiacrylate (HDODA), 68%; and a photoinitiator (2% diethoxyacetophenone), then the mixture was cured with ultraviolet light into a ⅛ inch thick disk or sheet. The refractive index of the acrylic before curing was 1.4704 (white light) while the refractive index after curing was 1.4945. At helium-neon wavelengths (633 nm), the cured acrylic was found to have a refractive index of 1.4937. A thin disk of this material was prepared for bulk-optic throughput tests and the results are shown in FIG. 8. Only the transmission characteristics for rising temperature are shown. The falling temperature characteristic essentially refracted the rising characteristic except for at a few points, apparently due to the inability to simultaneously and accurately record both the throughput and temperature. A sample was heated using a hot air gun and allowed to cool under natural conditions.

Although various modifications may be suggested by those versed in the art, it should be understood that such modifications are within the scope of the invention herein and all such modifications are deemed to be within the scope over the invention as defined by the following claims.

We claim:

1. A thermooptical sensing device comprising an optical fiber, means for coupling light into said fiber and means for measuring changes in light transmission through said fiber to determine change in thermal environment around at least one predetermined section of said fiber, wherein said predetermined section comprises an amorphous cladding material surrounding said fiber characterized by a temperature dependent index of refraction over a predetermined temperature range such that at said section transmission of light through said section is substantially and reversibly changed when the temperature of said material is changed by a predetermined amount; the improvement wherein said cladding material comprises (a) modified organic polymers containing inorganic modifiers, wherein said modified organic polymers are essentially transparent to light at a first temperature and are essentially opaque to light when heated to a temperature within said predetermined temperature range;

(b) a polymer system comprising discrete phases of said modified organic polymers and said inorganic additive modifiers wherein said system is essentially transparent to light at a first temperature and is essentially opaque to light when heated to a temperature within said predetermined temperature range; or (c) thermochromic inorganic materials characterized by a change in transmission of light therethrough of a predetermined wavelength when said thermochromic inorganic materials are heated from a first temperature to a second temperature within said predetermined temperature range.

2. A device according to claim 1 wherein said modified organic polymer comprises neutralized maleic anhydride-modified butadiene and magnesium chloride.

3. A device according to claim 2 wherein said fiber is a monolithic fiber of uniform density.

4. A device according to claim 1 wherein said fiber comprises said material characterized by a temperature dependent index of refraction over a predetermined temperature range and said polymer system is formed from ethylene, propylene diene monomer rubber, silica, trimethylolpropane triacrylate and di-t-butyl peroxide.

5. A device according to claim 1 wherein said fiber comprises said material characterized by a temperature dependent index of refraction over a predetermined range and said polymer system is formed from a urethane diacrylate, trimethlolpropane, triacrylate, hexonedioldiacrylate and diethoxyacetoophenone, wherein said urethane adiacrylate is formed from isophorone diisocyanate, polypropylene glycol and hydroxyethylacrylate.

6. A device according to claim 1 wherein said thermochromic inorganic material is selected from the group consisting of mercuric iodide and copper nitrate.

7. A device according to claim 1 wherein said, modified organic polymer, polymer system or thermochromic inorganic material is reversibly converted thermally between being essentially opaque to essentially transparent to said light or wavelength of light.

8. A device according to claim 1 wherein said measuring means detects light of a predetermined wavelength.

9. A device according to claim 1 wherein said measuring means detects light or different wavelengths.

10. A device according to claim 1 wherein said fiber comprises said material characterized by a temperature dependent index of refraction over a predetermined temperature range and said material comprises said thermoplastic polymer forming a core, said core characterized by an essentially temperature independent index of refraction within said temperature range, whereby transmission of light in said core is reduced when said material is essentially transparent.

11. A device according to claim 2, 4 or 5 wherein said material characterized by a temperature dependent index of refraction over a predetermined temperature range comprises a cladding surrounding said fiber.

12. A device according to claim 1 wherein said first temperature is about room temperature.

* * * * *

UNITED STATES PATENT AND TRADEMARK OFFICE
CERTIFICATE OF CORRECTION

PATENT NO. : 5,052,820

DATED : October 1, 1991

INVENTOR(S) : Vincent D. McGinniss, et al

It is certified that error appears in the above-identified patent and that said Letters Patent is hereby corrected as shown below:

Column 4, line 34: "(...rubber from Dupont)..." should read "(...rubber from DuPont)".

Column 5, line 44: "...mode where detailed..." should read "...mode where details..."

Column 5, line 50: "...arlimines..." should read "...arylimines..."

Signed and Sealed this

Thirtieth Day of March, 1993

*Attest:*

STEPHEN G. KUNIN

*Attesting Officer*      *Acting Commissioner of Patents and Trademarks*